United States Patent
Blasco Gonzalez et al.

(10) Patent No.: US 12,088,183 B2
(45) Date of Patent: Sep. 10, 2024

(54) ELECTRICAL SYSTEM

(71) Applicant: Lear Corporation, Southfield, MI (US)

(72) Inventors: Lorenzo Blasco Gonzalez, Barcelona (ES); Fernando Gallego, Tarragona (ES)

(73) Assignee: Lear Corporation, Southfield, MI (US)

( * ) Notice: Subject to any disclaimer, the term of this patent is extended or adjusted under 35 U.S.C. 154(b) by 366 days.

(21) Appl. No.: 17/505,083

(22) Filed: Oct. 19, 2021

(65) Prior Publication Data

US 2023/0119272 A1     Apr. 20, 2023

(51) Int. Cl.
     *H02M 3/158*      (2006.01)
     *H02M 1/00*      (2006.01)

(52) U.S. Cl.
     CPC ....... *H02M 1/0009* (2021.05); *H02M 3/1584* (2013.01)

(58) Field of Classification Search
CPC .. H02M 1/0009; H02M 3/155; H02M 1/0032; H02M 3/1584
See application file for complete search history.

(56) References Cited

U.S. PATENT DOCUMENTS

| | | | |
|---|---|---|---|
| 5,867,008 A | 2/1999 | Du et al. | |
| 6,381,111 B1 | 4/2002 | Reichert et al. | |
| 6,494,409 B1 | 12/2002 | Franke | |
| 6,710,698 B1 | 3/2004 | Jehlicka et al. | |
| 7,156,063 B2 | 1/2007 | Denz | |
| 9,280,165 B2 | 3/2016 | Fujii | |
| 10,923,902 B2 | 2/2021 | Schiemann et al. | |
| 10,951,022 B2 | 3/2021 | Lang | |
| 2013/0313896 A1 | 11/2013 | Gless et al. | |
| 2017/0141599 A1 | 5/2017 | Naddei | |
| 2019/0356161 A1* | 11/2019 | Wakazono | H02J 7/0071 |
| 2019/0379200 A1 | 12/2019 | Fournier et al. | |

(Continued)

FOREIGN PATENT DOCUMENTS

| | | |
|---|---|---|
| CN | 101549673 A | 10/2009 |
| CN | 102673421 B | 12/2014 |

(Continued)

OTHER PUBLICATIONS

Co-pending U.S. Appl. No. 17/123,678, filed Dec. 16, 2020.

*Primary Examiner* — Kyle J Moody
(74) *Attorney, Agent, or Firm* — Fishman Stewart PLLC

(57) ABSTRACT

An electrical system may include an electronic control unit (ECU), a load driver connected to the ECU and configured to selectively provide a first electrical connection between a power source and a load, and/or a secondary power circuit connected to the ECU and configured to selectively provide a second electrical connection between said power source and said load. The secondary power circuit may include a wake-up circuit including a wake-up circuit switch, a trigger circuit including a trigger circuit switch, a sensing circuit including a sensing circuit switch; a switching circuit including a switching circuit switch; and/or a disable circuit connected to the ECU. The ECU may be configured to control the disable circuit to selectively open the switching circuit switch. The disable circuit may include a first disable circuit switch connected to ground and a second disable circuit switch connected to the switching circuit switch.

20 Claims, 3 Drawing Sheets

(56) References Cited

U.S. PATENT DOCUMENTS

| | | | |
|---|---|---|---|
| 2021/0050789 A1* | 2/2021 | Gelman | G05F 1/59 |
| 2021/0066905 A1 | 3/2021 | Heinrich et al. | |
| 2022/0057855 A1* | 2/2022 | Zou | H02M 1/0048 |
| 2022/0294352 A1* | 9/2022 | Wu | H02M 1/0032 |
| 2022/0337162 A1* | 10/2022 | Shen | G06F 1/3206 |

FOREIGN PATENT DOCUMENTS

| | | |
|---|---|---|
| CN | 107276871 A | 10/2017 |
| DE | 10110046 A1 | 9/2002 |
| DE | 102005040195 A1 | 3/2007 |
| DE | 102010020294 A1 | 8/2011 |
| DE | 10301528 B4 | 7/2014 |
| DE | 102013217494 A1 | 3/2015 |
| DE | 102014211083 A1 | 12/2015 |
| DE | 202016101273 U1 | 4/2016 |
| DE | 202016105015 U1 | 3/2017 |
| FR | 3055495 A1 | 3/2018 |

* cited by examiner

ELECTRICAL SYSTEM

TECHNICAL FIELD

The present disclosure generally relates to electrical systems, including electrical systems that may be utilized in connection with providing power to loads, such as for vehicle applications, for example.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical systems may not provide sufficient functionality, may be complicated, may be expensive, and/or may have high power consumption.

There is a desire for solutions/options that minimize or eliminate one or more challenges or shortcomings of electrical systems. The foregoing discussion is intended only to illustrate examples of the present field and is not a disavowal of scope.

SUMMARY

In embodiments, an electrical system may comprise an electronic control unit (ECU), a load driver connected to the ECU and configured to selectively provide a first electrical connection between a power source and a load, and/or a secondary power circuit connected to the ECU and configured to selectively provide a second electrical connection between said power source and said load. The secondary power circuit may include a wake-up circuit including a wake-up circuit switch, a trigger circuit including a trigger circuit switch, a sensing circuit including a sensing circuit switch, a supply circuit including a supply circuit switch (e.g., a sleep current switch), and/or a disable circuit connected to the ECU. The ECU may be configured to control the disable circuit to selectively open the supply circuit switch and disconnect the second electrical connection. The disable circuit may include a first disable circuit switch connected to ground and a second disable circuit switch connected to the supply circuit switch and the first disable circuit switch.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
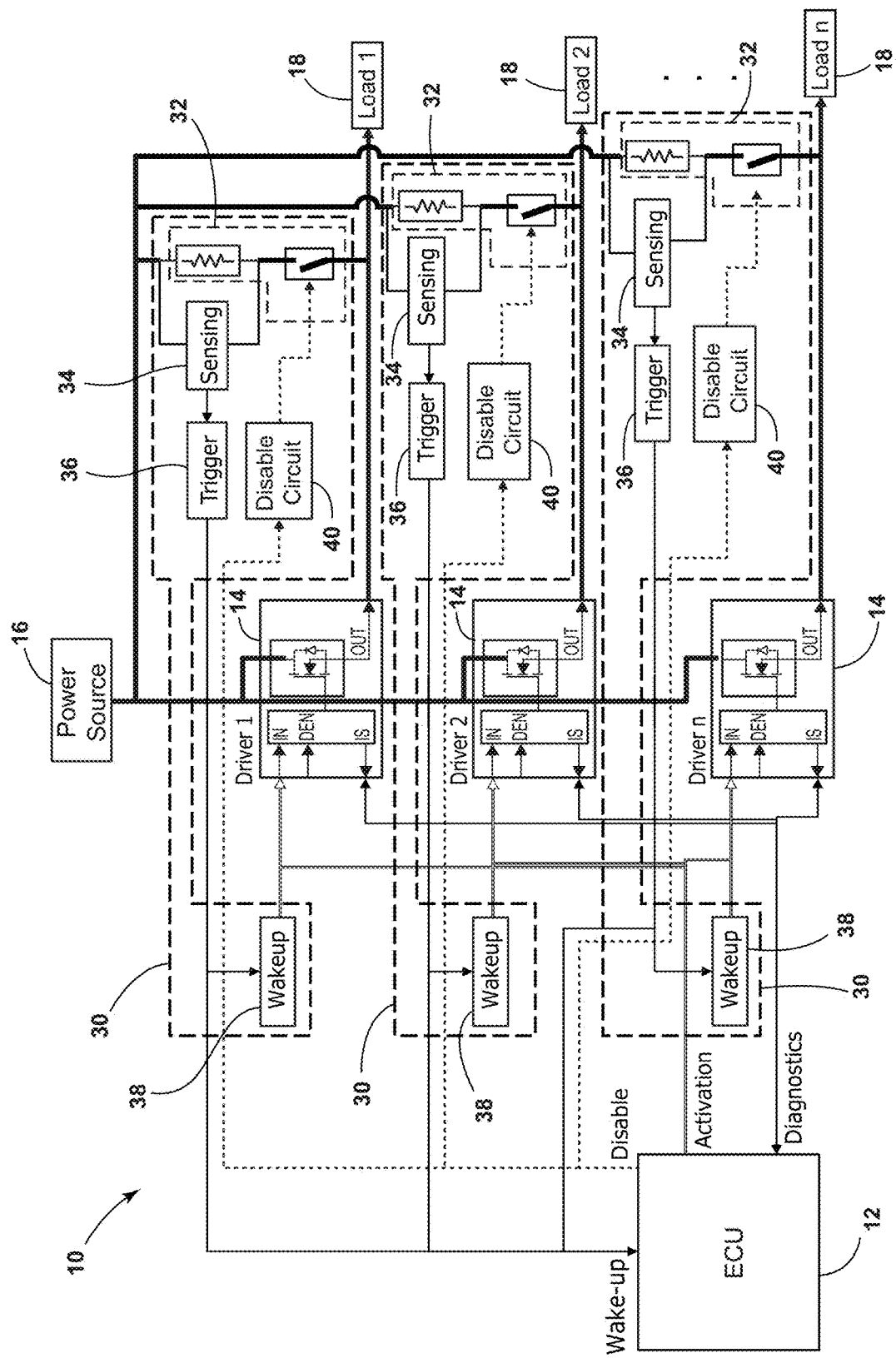
FIG. 1 is a schematic view generally illustrating an embodiment of an electrical system according to teachings of the present disclosure.

With embodiments, such as generally illustrated in FIG. 1, an electrical system 10 may include an electronic control unit (ECU) 12 that may be connected to one or more load drivers 14 that may be connected to a power source 16 and respective one or more loads or groups of loads 18. The ECU 12 may control the load drivers 14 to selectively provide power from the power source 16 to the loads 18 via a first electrical connection (e.g., from the power source 16 through a respective load driver 14 to a respective load 18).

With embodiments, an electrical system 10 may include one or more secondary power circuits 30 that may be configured to selectively provide power from the power source 16 to the one or more loads 18 via one or more second electrical connections. A secondary power circuit 30 may be connected/disposed in parallel to a load driver 14. For example, in some instances, one or more portions of an electrical system 10 may operate in a low power/standby/sleep mode that may involve one or more components, such as the ECU 12, one or more load drivers 14, and/or one or more loads 18 utilizing less power. In such instances, it may be useful to provide a certain amount of current to one or more loads 18. For example and without limitation, in a vehicle application, some loads 18 may include components (e.g., keyless entry, among others) that may be at least partially operational when the vehicle is in a standby/off state and that may, on their own or collectively, utilize a relatively small amount of current (e.g., 30%, 20%, or 10% or less of the current provided via and/or the current capacity of a load driver 14), which may be referred to as a sleep current or secondary current. For example and without limitation, for a nominal current of about 100 mA to about 3 A for loads 18, a sleep current may be about 50 µA to about 200 µA. The secondary power circuit 30 may be configured to provide sleep current.

In embodiments, a secondary power circuit 30 may include a supply circuit 32, a sensing circuit 34, a trigger circuit 36, a wake-up circuit 38, and/or a disable circuit 40.

Figure 2:
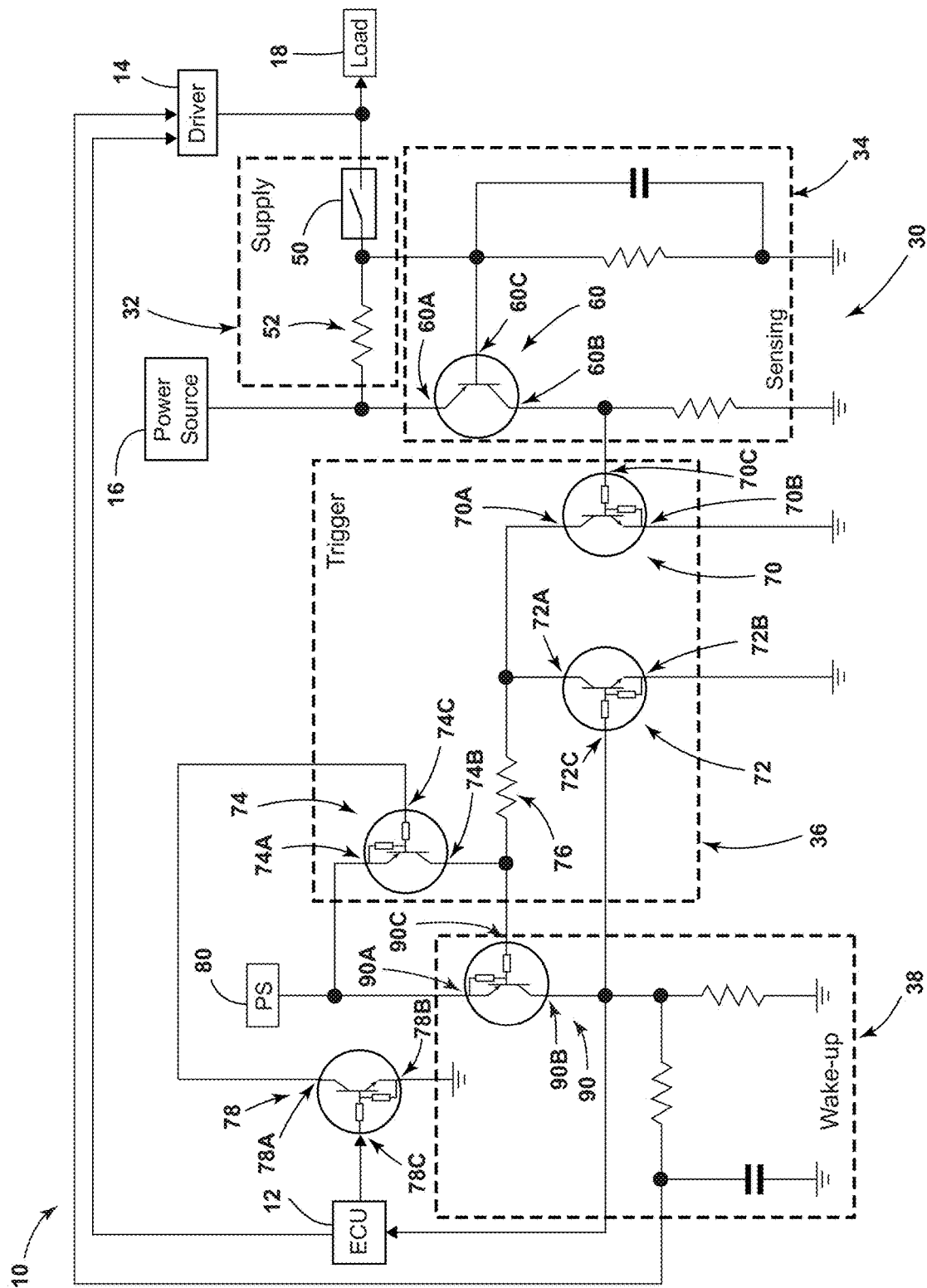
FIG. 2 is a schematic view generally illustrating portions of an embodiment of an electrical system according to teachings of the present disclosure.

With embodiments, such as generally illustrated in FIG. 2, a supply circuit 32 may include a supply circuit switch 50 and/or a resistor 52. The resistor 52 may be connected to the power source 16 and/or the supply circuit switch 50. For example, the resistor 52 may be connected in series between the power source 16 and the supply circuit switch 50. The supply circuit switch 50 may include one or more of a variety of configurations. For example and without limitation, the supply circuit switch 50 may include a contactor, a relay, and/or a transistor, such as a P-channel MOSFET (metal-oxide-semiconductor field-effect transistor) (see, e.g., FIG. 3). When the supply circuit switch 50 is closed, the supply circuit switch 50 may provide, at least in part, the second electrical connection between the power source 16 and a load 18. When the supply circuit switch 50 is open, the supply circuit switch 50 may open/disconnect the second electrical connection and/or disconnect the load 18 from the power source 16 (e.g., if the load 18 is not separately connected via the first electrical connection). In some embodiments, a resistance of the resistor 52 may be configured according to a desired sleep current (e.g., continuous sleep current) to provide to the load 18, such as depending on the voltage of the power source 16 and/or a resistance of the load 18. In some configurations, for example and without limitation, the resistance may be about 10Ω, but may be other values.

In embodiments, such as generally illustrated in FIG. 2, a sensing circuit 34 may include a sensing circuit switch 60. The sensing circuit switch 60 may include one or more of a variety of configurations. For example and without limitation, the sensing circuit switch 60 may include a transistor, such as a BJT (bipolar junction transistor). The sensing circuit switch 60 may, at least in some instances, be configured as a PNP BJT with an emitter 60A, a collector 60B, and/or a base 60C. The emitter 60A may be connected to the power source 16 and/or the resistor 52 of the supply circuit 32. The collector 60B may be connected to the trigger circuit 36. The base 60C may be connected to the resistor 52, such as between the resistor 52 and the supply circuit switch 50 such that a voltage between the emitter 60A and the base 60C corresponds to a voltage drop across the resistor 52. The voltage drop across the resistor 52 may correspond to the current flowing through the resistor 52 and/or the current draw of the load 18 from the power source 16.

With embodiments, the sensing circuit 34 may sense, at least indirectly, the current draw/consumption of the load 18. If the current draw meets or exceeds a threshold (e.g., a sleep current threshold), it may be desirable to wake up the ECU 12 and/or the load driver 14 to provide increased/full power to the load 18. The sleep current threshold may, for example and without limitation, be a certain amount above an expected sleep current (e.g., 10%, 25%, 50%, or more or less) and/or may include currents that are within an expected nominal current range. When the current draw meets or exceeds the sleep current threshold, the voltage drop across the resistor 52 may decrease the voltage at the base 60C of the sensing circuit switch 60, which may close the sensing circuit switch 60. When the sensing circuit switch 60 closes, the sensing circuit switch 60 may connect the power source 16 to the trigger circuit 36, which may activate the trigger circuit 36.

In embodiments, such as generally illustrated in FIG. 2, a trigger circuit 36 may include a first trigger circuit switch 70, a second trigger circuit switch 72, and/or a third trigger circuit switch 74. The trigger circuit switches 70-74 may include one or more of a variety of configurations. For example and without limitation, the trigger circuit switches 70-74 may include transistors, such as BJTs. The first trigger circuit switch 70 may, at least in some instances, be configured as a NPN BJT with a collector 70A, an emitter 70B, and/or a base 70C. The second trigger circuit switch 72 may, at least in some instances, be configured as a NPN BJT with a collector 72A, an emitter 72B, and/or a base 72C. The third trigger circuit switch 74 may, at least in some instances, be configured as a PNP BJT with an emitter 74A, a collector 74B, and/or a base 74C.

With embodiments, the collector 70A of the first trigger circuit switch 70 may be connected to the collector 72A of the second trigger circuit switch 72, the wake-up circuit 38 (e.g., via a resistor 76), and/or the collector 74B of the third trigger circuit switch 74. The emitter 70B of the first trigger circuit switch 70 may be connected to electrical ground. The base 70C of the first trigger circuit switch 70 may be connected to the sensing circuit 34, such as to the collector 60B of the sensing circuit switch 60. For example, when the sensing circuit switch 60 closes, the sensing circuit switch 60 may provide a connection from the second power source 80 to the base 70C of the first trigger circuit switch 70, which may close the first trigger circuit switch 70 to start triggering a wake-up.

In embodiments, closing the first trigger circuit switch 70 may connect one or more portions of the wake-up circuit 38 to electrical ground, such as a wake-up circuit switch 90 of the wake-up circuit 38, for example. The wake-up circuit switch 90 may include one or more of a variety of configurations. For example and without limitation, the wake-up circuit switch 90 may include a transistor, such as a BJT. The wake-up circuit switch 90 may, at least in some instances, be configured as a PNP BJT with an emitter 90A, a collector 90B, and/or a base 90C. The emitter 90A may be connected to the second power source 80 and/or to the emitter 74A of the third trigger circuit switch 74. The collector 90B may be connected to the ECU 12, the load driver 14, and/or a base 72C of the second trigger circuit switch 72. The base 90C may be connected to the collector 74B of the third trigger circuit switch 74 such that a voltage between the emitter 90A and the base 90C corresponds, at least in some circumstances, to a voltage drop across the third trigger circuit switch 74. Additionally or alternatively, the base 90C may be connected to the collector 70A of the first trigger circuit switch 70 and/or the collector 72A of the second trigger circuit switch 72, such as via the resistor 76. If the first trigger circuit switch 70 closes, such as in response to the sensing circuit switch 60 closing, the first trigger circuit switch 70 may connect the base 90C of the wake-up circuit switch 90 to ground, which may cause the wake-up circuit switch 90 to close (e.g., create a sufficient voltage difference between emitter 90A and base 90C). When the wake-up circuit switch 90 closes, the wake-up circuit switch 90 may connect the ECU 12 and/or the load driver 14 to a second power source 80, which may wake-up and/or initiate a wake-up of the ECU 12 and/or the load driver 14 to provide more and/or full power to the load 18 (e.g., tens or hundreds of amps). The second power source 80 may, for example, be a lower power source that may, in some configurations, provide a voltage of about 5 V. In some configurations, the power source 16 may provide a voltage of about 12 V, but may provide other voltages, and may or may not be connected to the second power source 80.

With some embodiments, when the wake-up circuit switch 90 closes, the wake-up circuit switch 90 may connect the second power source 80 to the base 72C of the second trigger circuit switch 72, which may close the second trigger circuit switch 72. The second trigger circuit switch 72 may function as a latch for the wake-up circuit switch 90. In some configurations, activating the load driver 14 may reduce the current at resistor 52 (e.g., the resistance of the load driver 14 may be significantly less than the resistor 52), which may cause the sensing circuit switch 60 to open, but the second trigger circuit switch 72 may function to keep the wake-up circuit switch 90 closed, which may limit and/or prevent cycling of the load driver 14 on and off.

In embodiments, the secondary power circuit 30 providing a wake-up signal directly to the load driver 14 (e.g., in addition to and separate from providing it to the ECU 12) may improve the response time of the system 10 in transitioning from a sleep mode to providing full power to the load 18 (e.g., reduce a wake-up time). The response time may, for example and without limitation, be microseconds (e.g., less than 100 μs) compared to milliseconds for polling methods. The ECU 12 may receive the wake-up signal from the secondary power circuit 30 and separately provide a wake-up or activation signal to the load driver 14 to cause the load driver 14 to continue supplying power to the load 18.

With embodiments, waking up the ECU 12 only when wake-up conditions are met may reduce power consumption by the ECU 12, such as relative to polling methods that may wake an ECU periodically to determine if wake-up conditions are met. Additionally or alternatively, as an output of the secondary power circuit 30 may include a wake-up signal, the ECU 12 may utilize fewer internal stages and/or I/O pins as the ECU 12 may not carry out a determination of whether wake-up conditions are met.

With embodiments, an ECU 12 may be configured to control, at least in part, operation of a secondary power circuit 30, such as via the third trigger circuit switch 74 and/or a deactivation switch 78 of the secondary power circuit 30. The deactivation switch 78 may include one or more of a variety of configurations. For example and without limitation, the deactivation switch 78 may include a transistor, such as a BJT. The deactivation switch 78 may, at least in some instances, be configured as a NPN BJT with a collector 78A, an emitter 78B, and/or a base 78C. The collector 78A may be connected to the base 74C of the third trigger circuit switch 74. The emitter 78B may be connected to ground. The base 78C may be connected to the ECU 12. In some configurations, a deactivation switch 78 may be included with a trigger circuit 36.

With embodiments, the emitter 74A of the third trigger circuit switch 74 may be connected to a second power source 80. The collector 74B may be connected to the wake-up circuit 38, the first trigger circuit switch 70, and/or the second trigger circuit switch 72. For example and without limitation, the collector 74B may be connected to the collector 70A of the first trigger circuit switch 70 and/or to the collector 72A of the second trigger circuit switch 72, such as via a resistor 76. The base 74C of the third trigger circuit switch 74 may be connected to the deactivation switch 78 of the secondary power circuit 30. The ECU 12 may control the deactivation switch 78 to deactivate the wake-up functionality of the secondary power circuit 30. For example, if the ECU 12 provides a deactivation signal to the deactivation switch 78, the deactivation switch 78 may connect the base 74C of the third trigger circuit switch 74 to ground, which may close the third trigger circuit switch 74. Closing the third trigger circuit switch 74 may cause the third trigger circuit switch 74 to have minimal resistance between the emitter 74A and the collector 74B, which may effectively provide the voltage of the second power source 80 to the base 90C of the wake-up circuit switch 90 (e.g., substantially the same or similar to the voltage at the emitter 90A of the wake-up circuit switch 90), which may prevent closing of the wake-up circuit switch 90, even if the first trigger circuit switch 70 closes. If the wake-up circuit switch 90 does not close, the secondary power circuit 30 may not attempt to wake up the ECU 12 or the driver 14. The ECU 12 may deactivate the wake-up functionality of the secondary power circuit 30 to directly control the load driver 14, which may include turning the load driver 14 off, such as in the event of an error or failure (e.g., short, overcurrent, overtemperature, etc.).

Embodiments of an electrical system 10 including a sensing circuit 34, a trigger circuit 36, and a wake-up circuit 38 may be configured for reduced and/or minimized power consumption. For example and without limitation, some embodiments of such an electrical system 10 may have a current consumption of about 50 μA when active (e.g., when a larger system and/or the ECU 12 are in a sleep/standby mode).

Figure 3:
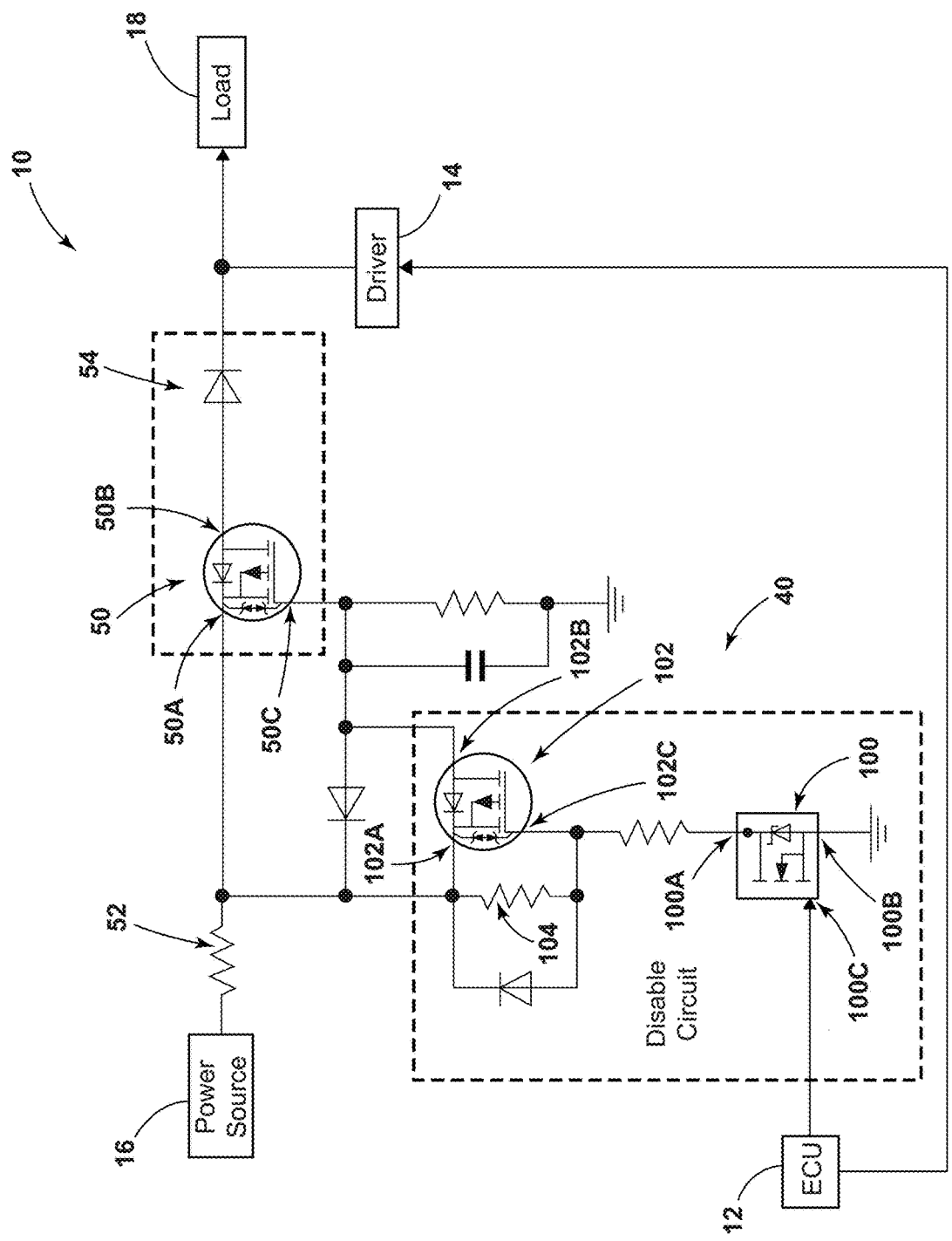
FIG. 3 is a schematic view generally illustrating portions of an embodiment of an electrical system according to teachings of the present disclosure.

With embodiments, such as generally illustrated in FIGS. 1 and 3, a secondary power circuit 30 may include a disable circuit 40. The ECU 12 may be configured to control, at least in part, the disable circuit 40 to selectively disable the secondary power circuit 30 from providing power to a load 18 (e.g., in addition or as an alternative to deactivating the wake-up functionality).

In embodiments, such as generally illustrated in FIG. 3, a disable circuit 40 may include a first disable circuit switch 100 and/or a second disable circuit switch 102. The first disable circuit switch 100 and the second disable circuit switch 102 may include one or more of a variety of configurations, which may or more not be the same. For example and without limitation, the first disable circuit switch 100 and the second disable circuit switch 102 may include transistors, such as an N-channel MOSFET and a P-channel MOSFET, respectively. The first disable circuit switch 100 may include a drain 100A, a source 100B, and a gate 100C. The second disable circuit switch 102 may include a source 102A, a drain 102B, and a gate 102C.

With embodiments, a disable circuit 40 may be connected to a supply circuit 32 and/or may be configured to control, at least in part, operation of a supply circuit switch 50 of the supply circuit 32. With some embodiments, the supply circuit switch 50 may include a P-channel MOSFET including a source 50A, a drain 50B, and a gate 50C. The source 50A may be connected to a resistor 52 that may be connected to a power source 16. The drain 50B may be connected to a diode 54, to an output of the driver 14, and/or to a load 18. The gate 50C may be connected to the disable circuit 40.

In embodiments, it may be desirable to disable the second electrical connection, such as in the event of a short-to-ground failure in/with a load 18, for example. The ECU 12 may be configured to control the disable circuit 40 to disable the second electrical connection. For example, the ECU 12 may provide a signal (e.g., a disable signal) to the first disable circuit switch 100, which may close the first disable circuit switch 100 and provide a path to ground. Providing the path to ground may allow current to flow through a resistor 104 that may be connected in parallel with the source 102A and the gate 102C of the second disable circuit switch 102, which may provide a low voltage at the gate 102C. The difference between a relatively high voltage at the source 102A and the lower voltage at the gate 102C may cause the second disable circuit switch 102 to close. Closing the second disable circuit switch 102 may provide the relatively high voltage at the source 102A to the gate 50C of the supply circuit switch 50 such that the voltage at the source 50A and the gate 50C is about the same, which may cause the supply circuit switch 50 open, disconnecting the second electrical connection. In some configurations, a latch circuit may be connected to the disable circuit 40 to maintain the state of the disable circuit 40, and/or the ECU 12 may be configured to maintain the state of the disable circuit 40, such as via a standby/sleep partition. In some embodiments, a resistance of the resistor 104 may, for example and without limitation, be at least 10 KΩ, such as about 47 KΩ, but may have other resistance values.

Embodiments of a disable circuit 40 may be configured for reduced and/or minimized power consumption. For example and without limitation, some embodiments of disable circuits 40 may have a current consumption of about 20 μA when the disable circuit 40 is not active (e.g., when the supply circuit switch 50 is closed) and/or about 200 μA when the disable circuit 40 is active (e.g., when the supply circuit switch 50 is open).

In embodiments, such as generally illustrated in FIG. 1, an electrical system 10 may include multiple loads or groups of loads 18. In some configurations, a load driver 14 and/or a secondary power circuit 30 may be provided for and/or connected to each load or group or loads 18 such that an electrical system 10 may include a plurality of load drivers 14 and a plurality of secondary power circuits 30.

With embodiments, portions of a secondary power circuit 30 may be utilized in connection with a plurality of loads 18. For example, one sensing circuit 34, one trigger circuit 36, and one wake-up circuit 38 may be utilized for a plurality of loads 18 that may each be connected to a respective switch 50 and/or a respective disable circuit 40. Such a configuration may reduce complexity, power consumption, and/or cost. In some configurations, a resistor 52 may be included with a sensing circuit 34, and/or a supply circuit 32 may or may not include a supply circuit switch 50.

With embodiments of electrical systems 10, quiescent current may be minimized compared to designs with larger components (e.g., relays, contactors, etc.) or greater numbers of components active during sleep.

In embodiments, a particular load 18 may include one or a plurality of electrical components that may themselves be electrical loads. In an example vehicle application of an embodiment of an electrical system 10, a power source 16 may include a vehicle battery, and/or a load 18 may include one or more vehicle systems, such as, for example and without limitation, keyless entry, controllers, sensors, infotainment, and/or seating, among others.

In examples, an ECU (e.g., ECU 12) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical system, comprising:
an electronic control unit (ECU);
a load driver connected to the ECU and configured to selectively provide a first electrical connection between a power source and a load; and
a secondary power circuit connected to the ECU and configured to selectively provide a second electrical connection between said power source and said load;
the secondary power circuit including a plurality of switches connected to:
selectively provide the second electrical connection;
sense a current provided via the second electrical connection via a sensing current switch; and
wake up the ECU and the load driver if the current meets or exceeds a threshold via a wake-up circuit switch;
wherein the sensing current switch is connected to a trigger circuit switch and the trigger circuit switch is connected to the wake-up circuit switch.

2. The electrical system of claim 1, wherein the trigger circuit switch is part of a trigger circuit that includes a second trigger circuit switch.

3. The electrical system of claim 1, wherein the secondary power circuit includes a disable circuit; and
the ECU is configured to control the disable circuit to selectively open a sleep current switch of the secondary power circuit to disable the second electrical connection.

4. The electrical system of claim 1, wherein the second electrical connection is disposed in parallel with the first electrical connection to provide a secondary current to said load; and the secondary current is 20% or less of a nominal current the load driver is configured for.

5. The electrical system of claim 4, wherein the nominal current is about 3 amps or less.

6. An electrical system, comprising:
an electronic control unit (ECU);
a load driver connected to the ECU and configured to selectively provide a first electrical connection between a power source and a load; and
a secondary power circuit connected to the ECU and configured to selectively provide a second electrical connection between said power source and said load;
wherein the secondary power circuit includes:
a supply circuit including a supply current switch;
a sensing circuit including a sensing circuit switch;
a trigger circuit including a trigger circuit switch; and
a wake-up circuit including a wake-up circuit switch.

7. The electrical system of claim 2, including a deactivation switch connected to the ECU, electrical ground, and the trigger circuit.

8. The electrical system of claim 6, wherein the sensing circuit switch, the trigger circuit switch, and the wake-up circuit switch include bipolar junction transistors (BJTs).

9. The electrical system of claim 8, wherein the sensing circuit switch includes a first PNP BJT;
the trigger circuit switch includes a NPN BJT; and
the wake-up circuit switch includes a second PNP BJT.

10. The electrical system of claim 9, wherein a collector of the sensing circuit switch is connected to a base of the trigger circuit switch; and
a collector of the trigger circuit switch is connected to a base of the wake-up circuit switch.

11. The electrical system of claim 10, wherein the trigger circuit includes a second trigger circuit switch.

12. The electrical system of claim 11, wherein the second trigger circuit switch includes a second NPN BJT;
a collector of the second trigger circuit switch is connected to the collector of the trigger circuit switch; and
a base of the second trigger circuit switch is connected to a collector of the wake-up circuit switch.

13. The electrical system of claim 12, wherein emitters of the trigger circuit switch and the second trigger circuit switch are connected to electrical ground.

14. The electrical system of claim 8, wherein the trigger circuit includes an additional trigger circuit switch; and
the additional trigger circuit switch is connected to a base of the wake-up circuit switch to selectively restrict closing of the wake-up circuit switch.

15. The electrical system of claim 14, including a deactivation switch connected to the ECU, electrical ground, and a base of the additional trigger circuit switch;
wherein the ECU is configured to control the deactivation switch to connect the base of the additional trigger circuit switch to ground to open the additional trigger circuit switch and connect the base of the wake-up circuit switch to a second power source to restrict the closing of the wake-up circuit switch.

16. An electrical system comprising:
an electronic control unit (ECU);
a load driver connected to the ECU and configured to selectively provide a first electrical connection between a power source and a load; and
a secondary power circuit connected to the ECU and configured to selectively provide a second electrical connection between said power source and said load;
wherein the secondary power circuit includes a disable circuit connected to the ECU; and the ECU is configured to control the disable circuit to selectively open a sleep current switch of the secondary power circuit to disable the second electrical connection; and the disable circuit includes a first disable circuit switch connected to ground and a second disable circuit switch connected to the sleep current switch of the secondary power circuit.

17. The electrical system of claim 16, wherein the disable circuit includes a disable circuit resistor disposed in parallel with the second disable circuit switch such that when the first disable circuit switch is closed, a voltage drop across the disable circuit resistor causes the second disable circuit switch to close, which causes the sleep current switch of the secondary power circuit to open and disconnect the second electrical connection.

18. An electrical system comprising:
an electronic control unit (ECU);
a load driver connected to the ECU and configured to selectively provide a first electrical connection between a power source and a load; and
a secondary power circuit connected to the ECU and configured to selectively provide a second electrical connection between said power source and said load;
wherein the secondary power circuit includes:
a wake-up circuit including a wake-up circuit switch;
a trigger circuit including a trigger circuit switch;
a sensing circuit including a sensing circuit switch;
a supply circuit including a supply circuit switch; and
a disable circuit connected to the ECU;
wherein the ECU is configured to control the disable circuit to selectively open the supply circuit switch; and
the disable circuit includes a first disable circuit switch connected to ground and a second disable circuit switch connected to the supply circuit switch.

19. The electrical system of claim 18, including:
the power source; and
the load;
wherein the supply circuit switch is connected to the power source via a resistor;
the sensing circuit is connected across the resistor; and
the switching circuit switch is connected the load and the load driver.

20. The electrical system of claim 19, wherein the wake-up circuit, the sensing circuit, and the trigger circuit are configured to cooperate to sense a current provided via the second electrical connection and wake up the ECU and the load driver if the current exceeds a threshold.

* * * * *